(12) United States Patent
Ouyang

(10) Patent No.: US 10,425,013 B2
(45) Date of Patent: Sep. 24, 2019

(54) RESONANT CONVERTER WITH IMPROVED LIGHT LOAD EFFICIENCY AND THE METHOD THEREOF

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/898,191

(22) Filed: Feb. 15, 2018

(65) Prior Publication Data

US 2018/0262118 A1 Sep. 13, 2018

(30) Foreign Application Priority Data

Mar. 13, 2017 (CN) .......................... 2017 1 0144657

(51) Int. Cl.
| | | |
|---|---|---|
| *H02M 1/00* | (2006.01) | |
| *H02M 1/08* | (2006.01) | |
| *H02M 3/335* | (2006.01) | |

(52) U.S. Cl.
CPC ....... *H02M 3/33576* (2013.01); *H02M 3/335* (2013.01); *H02M 1/08* (2013.01); *H02M 2001/0009* (2013.01); *H02M 2001/0032* (2013.01); *H02M 2001/0058* (2013.01); *Y02B 70/1433* (2013.01); *Y02B 70/1491* (2013.01); *Y02B 70/16* (2013.01); *Y02P 80/112* (2015.11)

(58) Field of Classification Search
CPC .................................................. H02M 3/335
See application file for complete search history.

(56) References Cited

U.S. PATENT DOCUMENTS

| | | |
|---|---|---|
| 8,400,790 B2 | 3/2013 | Zhang et al. |
| 8,537,584 B2 | 9/2013 | Ren et al. |
| 9,379,630 B2 | 6/2016 | Miao |
| 9,685,876 B2 | 6/2017 | Liu et al. |
| 9,812,975 B2 | 11/2017 | Chen |
| 9,893,635 B2 | 2/2018 | Lin |
| 2006/0187686 A1* | 8/2006 | Sun .................... H02M 3/33592 363/17 |
| 2008/0297122 A1* | 12/2008 | Zhou ...................... H02M 3/156 323/222 |
| 2017/0338746 A1* | 11/2017 | Chen ....................... H02M 1/08 |
| 2018/0131273 A1* | 5/2018 | de Cremoux ......... H02M 3/156 |
| 2018/0152111 A1* | 5/2018 | Tschirhart ......... H02M 3/33592 |
| 2018/0191252 A1* | 7/2018 | Bianco .............. H02M 3/33569 |

OTHER PUBLICATIONS

U.S. Appl. No. 15/665,354, filed Jul. 31, 2017, Chengdu Monolithic Power Systems.
U.S. Appl. No. 15/297,085, filed Oct. 19, 2016, Chengdu Monolithic Power Systems.
U.S. Appl. No. 15/846,137, filed Dec. 18, 2017, Hangzhou MPS Semiconductor Technology Ltd.

\* cited by examiner

*Primary Examiner* — Jue Zhang
*Assistant Examiner* — Trinh Q Dang
(74) *Attorney, Agent, or Firm* — Perkins Coie LLP

(57) ABSTRACT

A resonant converter highly improves light load efficiency. The resonant converter blocks control signals which are used to control power switches in an input power stage and an output stage in light load condition until an output voltage drops to a preset value. The input power stage and the output stage are coupled by way of a resonant net and a transformer.

14 Claims, 4 Drawing Sheets

RESONANT CONVERTER WITH IMPROVED LIGHT LOAD EFFICIENCY AND THE METHOD THEREOF

CROSS-REFERENCE TO RELATED APPLICATIONS

This application claims priority to and the benefit of Chinese Patent Application No. 201710144657.9, filed Mar. 13, 2017, which is incorporated herein by reference in its entirety.

FIELD

The present invention relates to electronic circuits, more specifically, the present invention relates to resonant converter.

BACKGROUND

Resonant converters such as LLC resonant converters are widely used in bus converter where no stringent load regulation is required. The resonant converter typically works with open loop control, and is designed to operate at a switching frequency fs according to the following equation (1) for best efficiency performance.

$$f_s = \frac{1}{2 \times \Pi \times (Lr \times Cr + Tdead)} \quad (1)$$

wherein Lr represents the inductance of a leakage inductor, Cr represents the capacitance of a resonant capacitor, Tdead represents the dead time between a high-side power switch and a low-side power switch in a power stage.

This switching frequency works well in heavy load condition. However, in light load condition, the primary current and the secondary current both decrease, so the conduction loss is low. But the driving loss and the switching loss are same as they are in the heavy load condition, which leads to low efficiency in light load condition.

SUMMARY

It is an object of the present invention to provide an improved resonant converter, which solves the above problems.

In accomplishing the above and other objects, there has been provided, in accordance with an embodiment of the present invention, a resonant converter, comprising: an input power stage, configured to receive an input voltage; a LLC resonant net, a transformer and an output power stage, coupled between the input power stage and an output port, to generate an output voltage to power a load; and a control circuit, configured to generate control signals to control the operation of the input power stage and the output power stage in response to a load current and the output voltage; wherein when the load current is lower than a light load threshold, the control signals are blocked until the output voltage falls to a preset value.

In addition, there has been provided, in accordance with an embodiment of the present invention, a method used in a resonant converter, the resonant converter being configured to receive an input voltage and to generate an output voltage to power a load, the resonant converter including an input power stage, a LLC resonant net and an output power stage, the method comprising: providing a clock signal with 50% duty cycle; monitoring the output voltage and a load current: when the load current is higher than a light load threshold, using the clock signal to control the input power stage and the output power stage, so as to provide the output voltage; and wherein when the load current is lower than the light load threshold, blocking the clock signal until the output voltage falls to a voltage reference signal.

Furthermore, there has been provided, in accordance with an embodiment of the present invention, a resonant converter, comprising: an input power stage, including a first power switch and a second power switch, the input power stage configured to receive an input voltage; an output power stage, including a first synchronous power switch and a second synchronous power switch, the output power stage coupled to the input power stage by way of a LLC resonant net and a transformer to generate an output voltage; and a control circuit, configured to generate control signals to control the first power switch, the second power switch, the first synchronous power switch and the second synchronous power switch in response to a load current and the output voltage; wherein when the load current is lower than a light load threshold, the control signals are blocked until the output voltage falls to a preset value.

The use of the similar reference label in different drawings indicates the same of like components.

DETAILED DESCRIPTION

Embodiments of circuits for resonant converter with improved light load efficiency are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
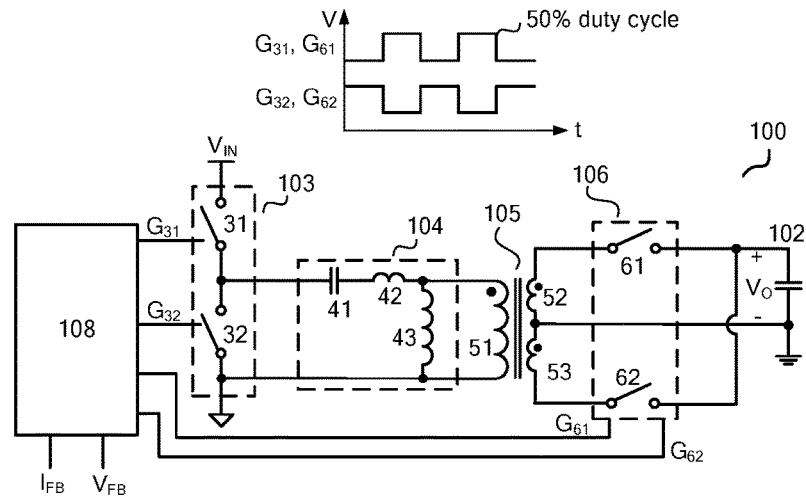
FIG. 1 schematically shows a resonant converter 100 in accordance with an embodiment of the present invention.

FIG. 1 schematically shows a resonant converter 100 in accordance with an embodiment of the present invention. In the example of FIG. 1, the resonant converter 100 comprises: an input power stage 103, coupled to an input port to receive an input voltage VIN; a resonant net 104, a transformer 105 and an output power stage 106, coupled between the input power stage 103 and an output port 102, to generate a regulated output voltage VO to power a load; and a control circuit 108, configured to generate control signals (G31, G32, G61 & G62) to control the operation of the input power stage 103 and the output power stage 106 in response to a load current (e.g. a current feedback signal indicative of the load current) and the output voltage VO (e.g. a voltage feedback signal VFB indicative of the output voltage): when the load current is lower than a light load threshold, the control signals are blocked until the output voltage falls to a preset value. That is, the input power stage 103 and the output power stage 106 both enter sleep mode when the load current is lower than the light load threshold; and maintains normal operation in other conditions.

In one embodiment, the input power stage 103 includes a first power switch 31 and a second power switch 32 coupled in series between the input port and a primary reference ground; a switch voltage is generated at a conjunction node of the first power switch 31 and the second power switch 32. The resonant net 104 is configured to receive the switch voltage to generate a resonant voltage.

In the example of FIG. 1, the transformer 105 comprises: a primary winding 51, a first secondary winding 52, and a second secondary winding 53, the primary winding 51 being coupled to the resonant net 104. The output power stage 106 includes a first synchronous power switch 61, coupled between the transformer 105 (the first secondary winding 52) and the output port 102; and a second synchronous power switch 62, coupled between the transformer 105 (the second secondary winding 52) and the output port 102. The first synchronous power switch 61 has a same conduction (ON/OFF) state as the first power switch 31, and the second synchronous power switch 62 has a same conduction (ON/OFF) state as the second power switch 32. That is, the first synchronous power switch 61 is controlled to be ON and OFF simultaneously as the first power switch 31; and the second synchronous power switch 62 is controlled to be ON and OFF simultaneously as the second power switch 32.

In one embodiment, the resonant net 104 comprises: a resonant capacitor 41 and an inductor 42, coupled in series between the conjunction node and the primary winding 51. In one embodiment, the inductor 42 is a leakage inductance of the primary winding. In other embodiments, the inductor 42 may also be an independent inductor. In real applications, the transformer further has a magnetic inductance 43, which is coupled to the primary winding 51 in parallel. The magnetic inductance 43, the resonant capacitor 41 and the inductor 42 together constitute a typical LLC resonant net. At the resonant frequency, the switch voltage at the conjunction node of the first power switch 31 and the second power switch 32 is transferred to the resonant voltage at the primary winding 51.

In one embodiment, the input voltage VIN comprises a 48V voltage signal provided by a front stage; and the output voltage VO is regulated to be 12V or 6V. The first power switch 31 and the second power switch 32 are controlled to be ON and OFF complementary. They have a same on time in each switching cycle. That is, each of them has a duty cycle of 50%.

In real applications, the second power switch 32 is turned on after a dead time from the time point when the first power switch 31 is turned off, and the first power switch 31 is turned on after a dead time from the time point when the second power switch 32 is turned off. That is, there is dead time between a falling edge of the control signal G31 and a rising edge of the control signal G32, and there is dead time between a falling edge of the control signal G32 and a rising edge of the control signal G31. However, the dead time is typically not reckoned in to the duty cycle. Because the first power switch 31 and the second power switch 32 are turned on alternately, and each has a same ON time in a switching cycle, the first power switch 31 and the second power switch 32 are still regarded as having a duty cycle of 50%.

In the example of FIG. 1, the input power stage 103 includes the first power switch 31 and the second power switch 32, which are configured as a half bridge. However, one skilled in the art should realize that, the input power stage can also be configured as a full bridge.

Figure 2:
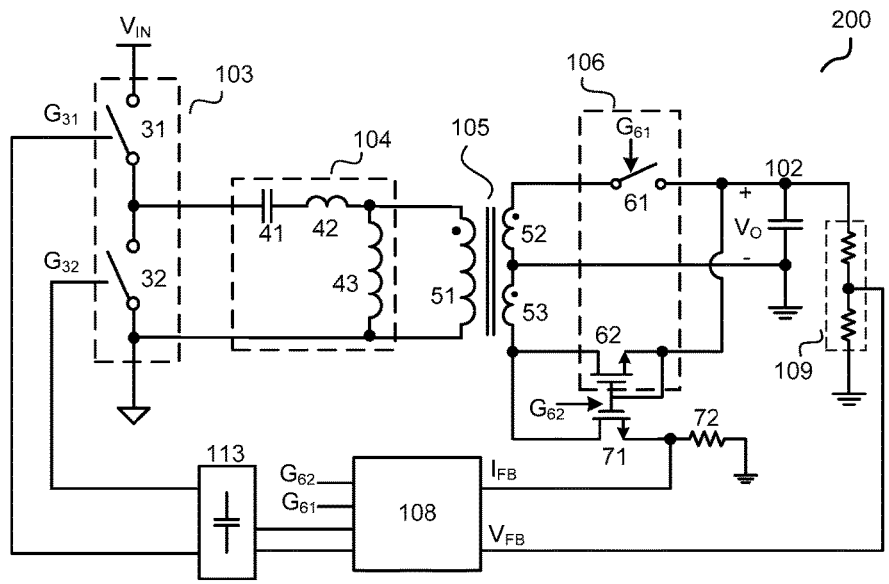
FIG. 2 schematically shows a resonant converter 200 in accordance with an embodiment of the present invention.

FIG. 2 schematically shows a resonant converter 200 in accordance with an embodiment of the present invention. The resonant converter 200 in FIG. 2 is similar to the resonant converter 100 in FIG. 1, with a difference that the resonant converter 200 in FIG. 2 further comprises: a voltage feedback circuit 109, coupled to the output port 102 to generate a voltage feedback signal VFB indicative of the output voltage VO; and a sense switch 71, wherein a current flowing through the sense switch 71 is proportional to a current flowing through the second synchronous power switch 62, i.e., the sense switch 71 and the second synchronous power switch 62 forms a current mirror, and the current flowing through the sense switch 71 is indicative of the load current.

In one embodiment, the current flowing through the second synchronous power switch 62 is 10000 times of the current flowing through the sense switch 71. However, one skilled in the art should realize that the current flowing through the sense switch 71 and the current flowing through the second synchronous power switch 62 may have any other desired relationships. During the ON time period of the second synchronous power switch 62, the load current also flows through the second synchronous power switch 62, so the current feedback signal IFB represents and is proportional to the load current.

Continue referring to FIG. 2, the resonant converter 200 further comprises: a connect resistor 72, series coupled to the sense switch 71, wherein a voltage across the connect resistor 65 is the current feedback signal IFB.

In the example of FIG. 2, the second synchronous power switches 62 and the sense switch 71 comprise a metal oxide semiconductor field effect transistor (MOSFET). However, one skilled in the art should realize that the synchronous power switch and the sense switch may adopt other suitable switch devices (such as bipolar junction transistor, BJT).

In the example of FIG. 2, the load current is sensed by sensing the current flowing through the second synchronous power switch 62. However, one skilled in the art should realize that the load current may be also sensed by sensing a current flowing through the first synchronous power switch 61 or by other suitable approaches in other embodiments.

In one embodiment, the primary side and the secondary side of the transformer may be not common-grounded, i.e., they may not have the same ground. Thus, electric isolation is needed when signals generated at the secondary side are delivered to the primary side. FIG. 2 schematically shows such electric isolation. In the example of FIG. 2, the resonant converter 200 further comprises: an isolation circuit 113, configured to convert the signals having the same ground as the secondary side into signals having the same ground as the primary side. In one embodiment, the isolation circuit 113 comprises a capacitor. But one skilled in the art should realize that in other embodiments, the primary side and the secondary side may refer to a same ground (i.e. they may be common-grounded). Then signals generated at the secondary side may be delivered to the primary side directly without isolation.

The other circuit configurations and the operation principle of the resonant converter 200 in FIG. 2 are similar to the resonant converter 100 in FIG. 1.

Figure 3:
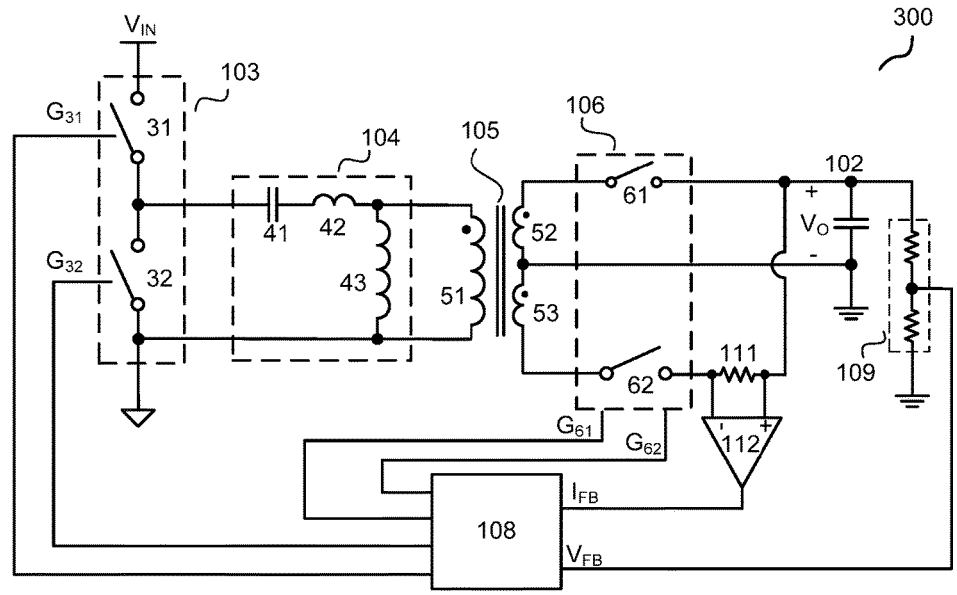
FIG. 3 schematically shows a resonant converter 300 in accordance with an embodiment of the present invention.

FIG. 3 schematically shows a resonant converter 300 in accordance with an embodiment of the present invention. The resonant converter 300 in FIG. 3 is similar to the resonant converter 200 in FIG. 2, with a difference that the resonant converter 300 in FIG. 3 schematically shows another current sense scheme for the load current. Particularly, in the example of FIG. 3, the resonant converter 300 further comprises: a voltage feedback circuit 109, coupled to the output port to generate a voltage feedback signal VFB indicative of the output voltage VO; a sense resistor 111, series coupled to the second synchronous power switch 62; and an operational amplifier 112, coupled across the sense resistor 111 to receive a voltage across the sense resistor 111, to provide the current feedback signal IFB indicative of the load current.

The other circuit configurations and the operation principle of the resonant converter 300 in FIG. 3 are similar to the resonant converter 100 in FIG. 1.

Figure 4:
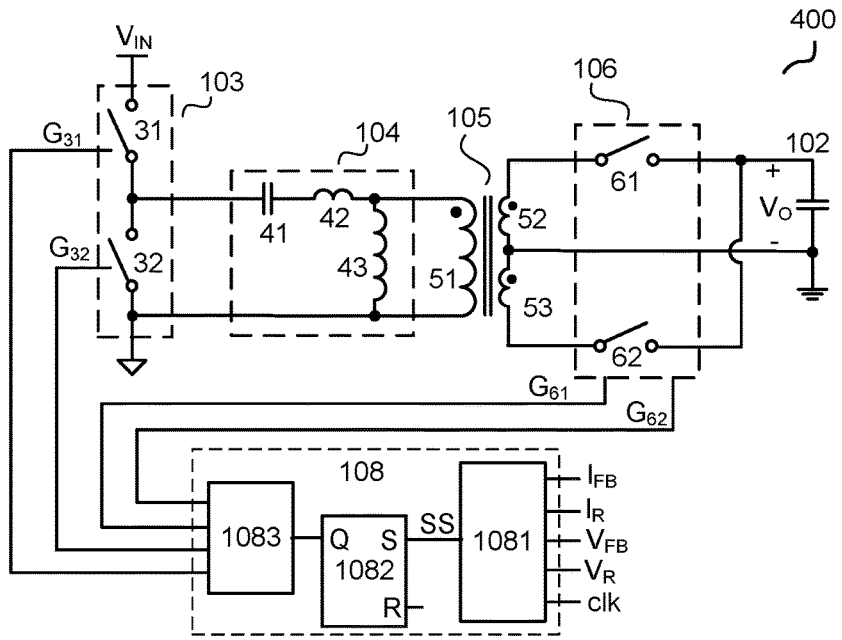
FIG. 4 schematically shows a resonant converter 400 in accordance with an embodiment of the present invention.

FIG. 4 schematically shows a resonant converter 400 in accordance with an embodiment of the present invention. The embodiment of FIG. 4 schematically shows a circuit configuration of the control circuit 108 in accordance with an embodiment of the present invention. In the example of FIG. 4, the control circuit 108 comprises: a set unit 1081, configured to receive the current feedback signal IFB indicative of the load current, a current reference signal IR, the voltage feedback signal VFB indicative of the output voltage VO, a voltage reference signal VR and a clock signal clk with 50% duty cycle, to generate a set signal SS; a logical unit 1082, configured to generate a logical signal in response to the set signal SS; and a drive unit 1083, configured to generate the control signals (e.g., the control signal G31 of the first power switch 31, the control signal G32 of the second power switch 32, the control signal G61 of the first synchronous power switch 61 and the control signal G62 of the second synchronous power switch 62) in response to logical signal: wherein in the condition when the current feedback signal IFB is lower than the current reference signal IR and the voltage feedback signal VFB is higher than the voltage reference signal VR, the clock signal clk is blocked, and the set signal SS is pulled to low; and in other conditions, the set SS signal is the clock signal clk.

The other circuit configurations and the operation principle of the resonant converter 400 in FIG. 4 are similar to the resonant converter 100 in FIG. 1.

Figure 5:
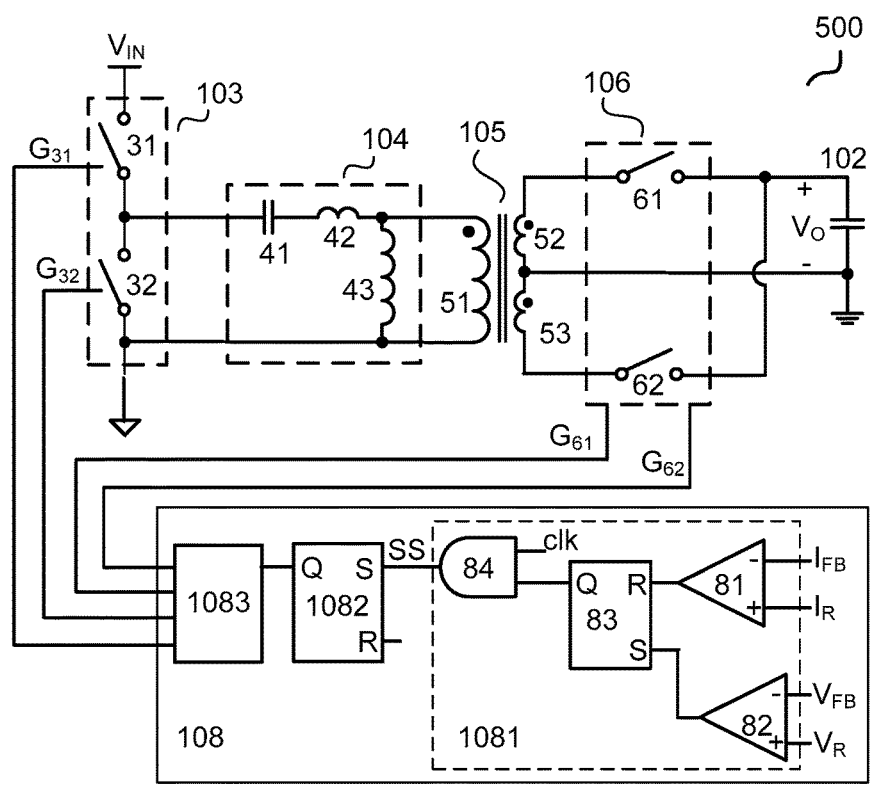
FIG. 5 schematically shows a resonant converter 500 in accordance with an embodiment of the present invention.

FIG. 5 schematically shows a resonant converter 500 in accordance with an embodiment of the present invention. The embodiment of FIG. 5 schematically shows a circuit configuration of the set unit 1081 in accordance with an embodiment of the present invention. In particular, the set unit 1081 comprises: a current comparator 81, configured to compare the current feedback signal IFB with the current reference signal IR, to generate a current comparison signal; a voltage comparator 82, configured to compare the voltage feedback signal VFB with the voltage reference signal VR, to generate a voltage comparison signal; a RS flip-flop 83, configured to be reset in response to the current comparison signal, and to be set in response to the voltage comparison signal, to generate a block signal, wherein the set has higher priority than reset; and a logical AND unit 84, configured to execute an AND operation on the clock signal clk and the block signal, to generate the set signal SS.

The other circuit configurations and the operation principle of the resonant converter 500 in FIG. 5 are similar to the resonant converter 100 in FIG. 1.

Figure 6:
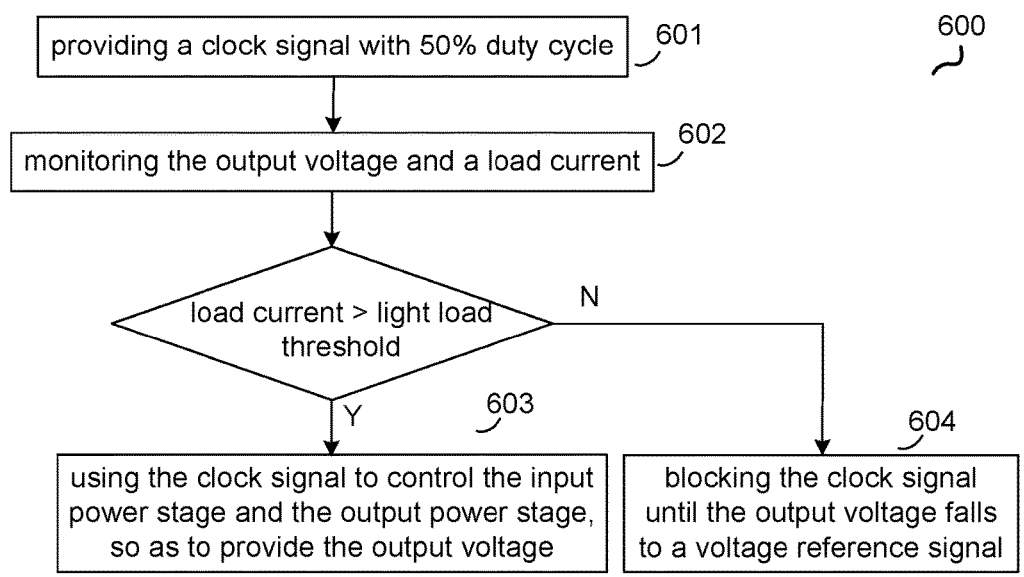
FIG. 6 schematically shows a flowchart 600 of a method used in a resonant converter in accordance with an embodiment of the present invention.

Furthermore, the present invention provides a method used in a resonant converter. FIG. 6 schematically shows a flowchart 600 of a method used in a resonant converter in accordance with an embodiment of the present invention, the resonant converter being configured to receive an input voltage and to generate an output voltage to power a load, the resonant converter including an input power stage, a resonant net and an output power stage, the method comprising:

Step 601, providing a clock signal with 50% duty cycle.

Step 602, monitoring the output voltage and a load current: when the load current is higher than a light load threshold, going to step 603; on the contrary, when the load current is lower than the light load threshold, going to step 604.

Step 603, using the clock signal to control the input power stage and the output power stage, so as to provide the output voltage.

Step 604, blocking the clock signal until the output voltage falls to a voltage reference signal.

In one embodiment, the input power stage includes a first power switch and a second power switch; and the output power stage includes a first synchronous power switch and a second synchronous power switch. The first synchronous power switch has a same conduction (ON/OFF) state as the first power switch, and the second synchronous power switch has a same conduction (ON/OFF) state as the second power switch. In one embodiment, the load current is monitored by sensing a current flowing through the first synchronous power switch or by sensing a current flowing through the second synchronous power switch.

Several embodiments of the foregoing resonant converter and the method thereof provide higher efficiency compared to conventional technique. Unlike the conventional technique, several embodiments of the foregoing resonant converter block the control signals when the load current falls to a light load threshold, so as to control the power stage to enter sleep mode. As a result, the power loss is reduced, and the operation efficiency is improved.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A resonant converter, comprising:
    an input power stage, configured to receive an input voltage, wherein the input power stage includes a first power switch and a second power switch;
    a LLC resonant net, a transformer and an output power stage, coupled between the input power stage and an output port, to generate an output voltage to power a load, wherein the output power stage includes a first synchronous power switch and a second synchronous power switch, and wherein the first synchronous power switch has a same ON/OFF state as the first power switch, and the second synchronous power switch has a same ON/OFF state as the second power switch;

a control circuit, configured to generate control signals to control the operation of the input power stage and the output power stage in response to a load current and the output voltage; wherein when the load current is lower than a light load threshold, the control signals are blocked until the output voltage falls to a preset value, and are unblocked when the output voltage falls to the preset value; and a voltage feedback circuit, configured to generate a voltage feedback signal indicative of the output voltage; and a sense switch, coupled to the second synchronous power switch to form a current mirror.

2. The resonant converter of claim 1, wherein:
the first power switch and the second power switch are controlled to be ON and OFF complementary; and
each of the first power switch and the second power switch has 50% duty cycle in a switching cycle.

3. The resonant converter of claim 1, further comprising:
a connect resistor, series coupled to the sense switch, wherein a voltage across the connect resistor is the current feedback signal.

4. The resonant converter of claim 1, wherein the control circuit comprises:
a set unit, configured to receive a current feedback signal indicative of the load current, a current reference signal, a voltage feedback signal indicative of the output voltage, a voltage reference signal and a clock signal with 50% duty cycle, to generate a set signal;
a logical unit, configured to generate a logical signal in response to the set signal; and
a drive unit, configure generate the control signals in response to logical signal:
wherein
in the condition when the current feedback signal is lower than the current reference signal and the voltage feedback signal is higher than the voltage reference signal, the clock signal is blocked and the set signal is pulled to low; and
in other conditions, the set signal is the clock signal.

5. The resonant converter of claim 4, wherein the set unit comprises:
a current comparator, configured to compare the current feedback signal with the current reference signal, to generate a current comparison signal;
a voltage comparator, configured to compare the voltage feedback signal with the voltage reference signal, to generate a voltage comparison signal;
a RS flip-flop, configured to be reset in response to the current comparison signal, and to be set in response to the voltage comparison signal, to generate a block signal, wherein the set has higher priority than the reset; and
a logical AND unit, configured to execute an AND operation on the clock signal and the block signal, to generate the set signal.

6. A method used in a resonant converter, the resonant converter being configured to receive an input voltage and to generate an output voltage to power a load, the resonant converter including an input power stage, a LLC resonant net and an output power stage, the method comprising:
providing a clock signal with 50% duty cycle;
monitoring the output voltage and a load current: when the load current is higher than a light load threshold, using the clock signal to control the input power stage and the output power stage, so as to provide the output voltage; and wherein when the load current is lower than the light load threshold, blocking the clock signal until the output voltage falls to a voltage reference signal.

7. The method of claim 6, wherein:
the input power stage includes a first power switch and a second power switch;
the output power stage includes a first synchronous power switch and a second synchronous power switch;
the first synchronous power switch has a same ON/OFF state as the first power switch; and
the second synchronous power switch has a same ON/OFF state as the second power switch.

8. The method of claim 7, further comprising:
controlling the first power switch and the second power switch to be ON and OFF complementary, with each of the power switches having 50% duty cycle in a switching cycle.

9. The method of claim 7, wherein:
the load current is monitored by sensing a current flowing through the first synchronous power switch or by sensing a current flowing through the second synchronous power switch.

10. A resonant converter, comprising:
an input power stage, including a first power switch and a second power switch, the input power stage configured to receive an input voltage;
an output power stage, including a first synchronous power switch and a second synchronous power switch, the output power stage coupled to the input power stage by way of a LLC resonant net and a transformer to generate an output voltage, wherein the first synchronous power switch has a same ON/OFF state as the first power switch, and the second synchronous power switch has a same ON/OFF state as the second power switch;
a control circuit, configured to generate control signals to control the first power switch, the second power switch, the first synchronous power switch and the second synchronous power switch in response to a load current and the output voltage; wherein when the load current is lower than a light load threshold, the control signals are blocked until the output voltage falls to a preset value; and
a voltage feedback circuit, configured to generate a voltage feedback signal indicative of the output voltage; and
a sense switch, wherein a current flowing through the sense switch is proportional to a current flowing through the second synchronous power switch.

11. The resonant converter of claim 10, wherein:
the first power switch and the second power switch are controlled to be ON and OFF complementary, with each of the power switches having 50% duty cycle in a switching cycle.

12. The resonant converter of claim 10, further comprising:
a connect resistor, series coupled to the sense switch, wherein a voltage across the connect resistor is the current feedback signal.

13. The resonant converter of claim 10, wherein the control circuit comprises:

a set unit, configured to receive a current feedback signal indicative of the load current, a current reference signal, a voltage feedback signal indicative of the output voltage, a voltage reference signal and a clock signal with 50% duty cycle, to generate a set signal;

a logical unit, configured to generate a logical signal in response to the set signal; and a drive unit, configure generate the control signals in response to logical signal:

wherein in the condition when the current feedback signal is lower than the current reference signal and the voltage feedback signal is higher than the voltage reference signal, the clock signal is blocked and the set signal is pulled to low; and in other conditions, the set signal is the clock signal.

14. The resonant converter of claim 13, wherein the set unit comprises:

a current comparator, configured to compare the current feedback signal with the current reference signal, to generate a current comparison signal;

a voltage comparator, configured to compare the voltage feedback signal with the voltage reference signal, to generate a voltage comparison signal;

a RS flip-flop, configured to be reset in response to the current comparison signal, and to be set in response to the voltage comparison signal, to generate a block signal, wherein the set has higher priority than the reset; and a logical AND unit, configured to execute an AND operation on the clock signal and the block signal, to generate the set signal.

* * * * *